(12) United States Patent
Beronius et al.

(10) Patent No.: US 9,611,694 B2
(45) Date of Patent: Apr. 4, 2017

(54) THREAD DEVICE, THREAD JOINT AND DRILL STRING COMPONENT FOR PERCUSSIVE ROCK DRILLING

(75) Inventors: Alexander Beronius, Fagersta (SE); Leif Nordfeldt, Söderbärke (SE)

(73) Assignee: ATLAS COPCO SECOROC AB, Fagersta (SE)

( * ) Notice: Subject to any disclaimer, the term of this patent is extended or adjusted under 35 U.S.C. 154(b) by 496 days.

(21) Appl. No.: 14/119,112

(22) PCT Filed: May 15, 2012

(86) PCT No.: PCT/SE2012/050523
§ 371 (c)(1),
(2), (4) Date: Nov. 20, 2013

(87) PCT Pub. No.: WO2012/161641
PCT Pub. Date: Nov. 29, 2012

(65) Prior Publication Data
US 2014/0083778 A1   Mar. 27, 2014

(30) Foreign Application Priority Data
May 20, 2011 (SE) ...................... 1100398

(51) Int. Cl.
*F16B 33/02* (2006.01)
*E21B 7/00* (2006.01)
(Continued)

(52) U.S. Cl.
CPC ................. *E21B 7/00* (2013.01); *E21B 1/00* (2013.01); *E21B 17/0426* (2013.01); *F16B 33/02* (2013.01)

(58) Field of Classification Search
CPC ...... E21B 17/0426; F16B 33/02; F16L 15/06; F16L 15/001
See application file for complete search history.

(56) References Cited

U.S. PATENT DOCUMENTS 3,645,570 A * 2/1972 Johansson ........... E21B 17/0426
285/334
4,040,756 A   8/1977 Donegan
(Continued)

FOREIGN PATENT DOCUMENTS

EA   200201045 A1   2/2003
GB   2161563 A      1/1986
(Continued)

OTHER PUBLICATIONS

PCT/ISA/210—International Search Report—Sep. 14, 2012 (Issued in Application No. PCT/SE2012/050523).
(Continued)

*Primary Examiner* — Rodney Mintz
*Assistant Examiner* — Daniel Kenny
(74) *Attorney, Agent, or Firm* — Venable, LLP

(57) ABSTRACT

A device in a drill string component for percussive rock drilling including a thread for threading together with another drill string component including a complementary thread. The thread includes a thread groove formed by two thread flanks and an intermediate thread bottom. In operation one of the flanks forms a pressure flank. The thread groove has an essentially equally shaped sectional form along its axial extension. The thread bottom exhibits at least three surface portions with part-circular shape, as seen in an axial section. The surface portions with part-circular shape have increasing radiuses, as seen from each thread flank to an intermediate surface portion of the thread bottom. Also a thread joint and a drill string component.

19 Claims, 4 Drawing Sheets

(51) Int. Cl.
*E21B 17/042* (2006.01)
*E21B 1/00* (2006.01)

(56) References Cited

U.S. PATENT DOCUMENTS

| | | | |
|---|---|---|---|
| 4,687,368 A | 8/1987 | Eklof et al. | |
| 4,760,887 A * | 8/1988 | Jansson | E21B 17/0426 |
| | | | 173/132 |
| 4,861,210 A | 8/1989 | Frerejacques | |
| 5,056,611 A | 10/1991 | Yousef et al. | |
| 5,060,740 A | 10/1991 | Yousef et al. | |
| 5,064,004 A | 11/1991 | Lundell | |
| 5,163,523 A | 11/1992 | Yousef et al. | |
| 5,785,360 A | 7/1998 | Nordfeldt et al. | |
| 6,196,598 B1 | 3/2001 | Yao | |
| 6,334,493 B2 | 1/2002 | Linden | |
| 6,394,190 B2 | 5/2002 | Linden | |
| 6,729,658 B2 | 5/2004 | Verdillon | |
| 6,810,956 B1 | 11/2004 | Sandstrom | |
| 6,861,612 B2 | 3/2005 | Bolton et al. | |
| 7,281,159 B2 | 10/2007 | Gold | |
| 7,416,374 B2 * | 8/2008 | Breihan | F16B 33/02 |
| | | | 285/334 |
| 7,661,727 B2 | 2/2010 | Roussie et al. | |
| 8,262,139 B2 | 9/2012 | Nava | |
| 2006/0222475 A1 | 10/2006 | Breihan et al. | |
| 2009/0078343 A1 | 3/2009 | Trevino, Jr. et al. | |
| 2010/0059285 A1 * | 3/2010 | Carlstrom | E21B 17/0426 |
| | | | 175/320 |
| 2010/0140929 A1 | 6/2010 | Nava | |

FOREIGN PATENT DOCUMENTS

| | | |
|---|---|---|
| GB | 2164358 A | 3/1986 |
| JP | 58-189326 A | 11/1983 |
| JP | 6-4892 B2 | 1/1994 |
| RU | 2204684 C2 | 5/2003 |
| RU | 2352848 C2 | 2/2005 |
| SE | 460301 B | 9/1989 |
| SE | 469602 B | 8/1993 |
| SE | 515194 C2 | 6/2001 |
| SE | 515195 C2 | 6/2001 |
| SE | 521458 C2 | 11/2003 |
| SE | 530158 C2 | 3/2008 |
| WO | WO-03/097991 A1 | 11/2003 |

OTHER PUBLICATIONS

PCT/ISA/237—Written Opinon of the International Searching Authority—Sep. 14, 2012 (Issued in Application No. PCT/SE2012/050523).

European Patent Office Communication—Oct. 28, 2015 (Issued in Application No. EP 12790106.4).

Russian Patent Office—Decision on Grant (Issued in Application No. 2013156677) Apr. 8, 2016.

* cited by examiner

THREAD DEVICE, THREAD JOINT AND DRILL STRING COMPONENT FOR PERCUSSIVE ROCK DRILLING

CROSS-REFERENCE TO RELATED APPLICATION

This application claims priority to Swedish patent application 1100398-5 filed 20 May 2011 and is the national phase of PCT/SE2012/050523 filed 15 May 2012.

FIELD OF THE INVENTION

The invention concerns a device in an drill string component for percussive rock drilling including a thread for threading together with another drill string component being provided with a complementary thread, wherein the thread includes a thread groove formed by two thread flanks and an intermediate thread bottom, and wherein the thread groove has an essentially equally shaped sectional form along its axial extension. The invention also concerns a thread joint and a drill string component.

BACKGROUND OF THE INVENTION

In order to joint drill string components for percussive rock drilling it is well known to use so called trapezoidal threads, wherein one end of a drill string component comprising a male thread is threaded together with a female thread at an end of the next drill string component. Alternatively, both ends of drill rods to be joined are threaded together over sleeves being provided with female threads at both ends.

Thread joints for drill string components or percussive rock drilling are subjected to high instantaneous loads and hostile environments. The threaded joints have to be drawn to moment levels that prevent loosening during operation, which means that large forces influence the respective thread wall of the male as well as the female thread. The working life length of the drill string components is related to the ability of the thread joints to resists the loads they are subjected to during operation. For that reason it is desired to provide threaded joints having the ability to better resists these loads and thereby give the components prolonged working life.

Another important aspect is producibility at low cost.

From U.S. Pat. No. 4,040,756 is previously known a threaded joint with inclined thread tops. When it concerns thread bottoms of the female as well as of the male thread, they are, however, provided with continuously curved configuration. The thread bottoms are going evenly, tangentially, over into adjacent thread flanks.

As further examples of the background art can be mentioned U.S. Pat. Nos. 6,196,598 and 4,687,368, whereof the latter concerns a more traditional trapezoidal thread.

THE AIM AND MOST IMPORTANT FEATURES OF THE INVENTION

It is an aim of the present invention to provide a further development of the devices according to the background art and to provide a device in a drill string component including a male thread as well as a drill string component and a method, wherein a resulting thread joint can be given greater resistibility to fatigue and thereby drilling can be performed with better economy.

These aims are obtained in respect of a device and a drill string component according to the above in that said thread bottom exhibits at least three surface portions with part-circular shape, as seen in an axial section, and that said surface portions with part-circular shape have increasing radiuses, as seen from each thread flank to an intermediate surface portion of the thread bottom.

Hereby is achieved that tension concentrations occurring in a most sensitive region of the thread, namely in connection to the root area of the pressure flank, will be widened and be levelled out as compared with the case of a conventional thread, irrespective if it concerns a trapezoidal type thread with partly linearly extending thread bottom or if it concerns a thread with evenly curved thread bottom.

According to the invention this is achieved in a thread that is economically advantages producible when the thread groove has an essentially equal shaped sectional shape along its extension and thereby can be produced with conventional production methods. Use of circular shapes of the surface portions results in simple and economically advantageous production. Determining the extension of the surface portions having part-circular shape in order to obtain the desired tension reducing effect can be made using conventional calculation methods.

It should be noted that a reduced tension concentration in this area of the thread bottom is very advantageous for the working life of the threaded joint, since already small reductions of the tension level in this area result in better resistibility to fatigue fractures and thereby thread failure.

Through the features of the invention it is achieved that the forces affecting the pressure flank, and to be received in the form of inner tensions in the material of the thread, will be received in a more advantageous way by the shape of the thread bottom being adapted for the reduction of forms that could increase tension concentrations. In particular it has unexpectedly been shown that the inventive construction results in extending tension distribution to at larger superficial portion of the thread bottom area and thereby reduced resulting maximal tension. In respect of the inventive construction, the surface portion having part-circular shape closest to the pressure flank is followed by a surface portion with greater radius or even with a plurality of surface portions having successively increasing radiuses, as seen in a direction towards an intermediate surface portion of the thread bottom.

A further advantage of the inventive construction compared to a conventional trapezoidal thread is that in a thread profile of a male thread according to the invention it will become easier to induce compressive stresses into the material through shot peening or through any other method that will plasticise material on a micro level, compared to the case in conventional threads. The reason for this is that accessibility for ejected shots will become better which leads to more even and more secure treatment of the thread.

Suitably said intermediate surface portion of the thread bottom is a central surface portion of the thread bottom.

It is preferred that said surface portions having part-circular shape are evenly passing over to one another and to an adjacent thread flank respectively. Hereby is intended that it exists tangential passages without tension inducing angles. It is preferred that they also pass directly over into each other without the intermediate or for example linear portions, since such passages do not contribute to tension level reduction.

Suitably a relation between a radius of a respective surface portion closest to a thread flank and a radius of a central surface portion of the thread bottom amounts to about 0.05-0.7, preferably to around 0.3-0.6, and most preferred to 0.35-0.55.

In one aspect of the invention, the thread groove, and in particular the thread bottom is asymmetrical as seen in said axial section. Asymmetric here means that the thread bottom as seen in the axial section lacks symmetry in respect of an imagined radial line (as indicated with interrupted line at L in FIG. 2) between two adjacent thread ridges.

Hereby the thread bottom suitably comprises such shape that a surface portion having part-circular shape adjoining to a thread flank, which is opposite to the pressure flank, extend more inwardly towards a symmetry axis of the drill string component than a surface portion with part-circular shape joining to a thread flank, which comprises the pressure flank. Preferably a thread flank being opposite to the pressure flank extends longer towards the symmetry axis of the drill string component than a thread flank forming the pressure flank does. A ratio between a radius of the surface portion having part-circular shape adjoining to the thread flank forming pressure flank and a radius of the surface portion having part-circular form adjoining to the thread flank being opposite to the pressure flank is thus in this embodiment greater than 1 and suitably between 1 and 10.

It is preferred that the thread flanks have linear extension as seen in an axial section of the drill string component.

In an embodiment of the invention, the thread is a conical thread, wherein a suitable cone angle of the conical thread is a cone angle of 2°-8°.

Preferably the thread bottom, at least in a surface area adjoining to a thread flank not being the pressure flank is constructed with such depth in respect of a height of a thread top of the thread that, in case of an angular deviation of a connected thread joint, contact is established between an adjacent thread top of the male thread and a thread bottom of the female thread whereby contact in said surface area adjoining to the second thread flank with a thread top of said female thread is avoided.

Hereby is achieved that the properties of the thread joint for drilling with obliquely deviating joint are enhanced.

In a non insignificant obliqueness resulting from relatively strongly curved drill holes, the risk of fatigue fracture of the threaded joint with loss of the drill string component into the drill hole as the result would otherwise increase.

Through this aspect is achieved that also in case of obliquely deviating thread joints, contact is avoided between the thread top of the female thread and a thread root portion of the male thread, whereby contact thus is avoided where the greatest tension concentration would have resulted. Such contact would otherwise lead to heating in the contact area, wherein the material would be unhardened and easily damaged which tends to bring about drawbacks with fatigue fractures of the male thread, since potential tension concentrations would occur in a highly unwanted position.

Through the invention is achieved that tension reduction and avoiding contacts in the bottom of the male thread according to the above in an advantageous manner can be combined, and in particular in respect of asymmetrically shaped thread grooves, the male thread can be shaped to satisfy principally different aims closest to the respective thread flank. Hereby the thread can be shaped such that a smallest cross section of the thread can be made greater compared to what would be the case according to the background art.

In a particularly preferred aspect, the thread is a male thread for threading together with a complementary female thread arranged on another drill string component. The thread is however, also advantageously a female thread for threading together with a complementary male thread arranged on another drill string component.

The invention also relates to a thread joint including a male thread and a female thread, wherein the thread joint is constructed with a device according to the above.

The invention further concerns a drill string component from the group: a drill bit, a drill rod, a joining sleeve, a shank adapter, which includes at least one device according to the above.

DESCRIPTION OF EMBODIMENTS

The group "drill string components", being intended with this invention, includes drill bits, drill rods, shank adapters, joining sleeves and transfer adapters.

Figure 1:
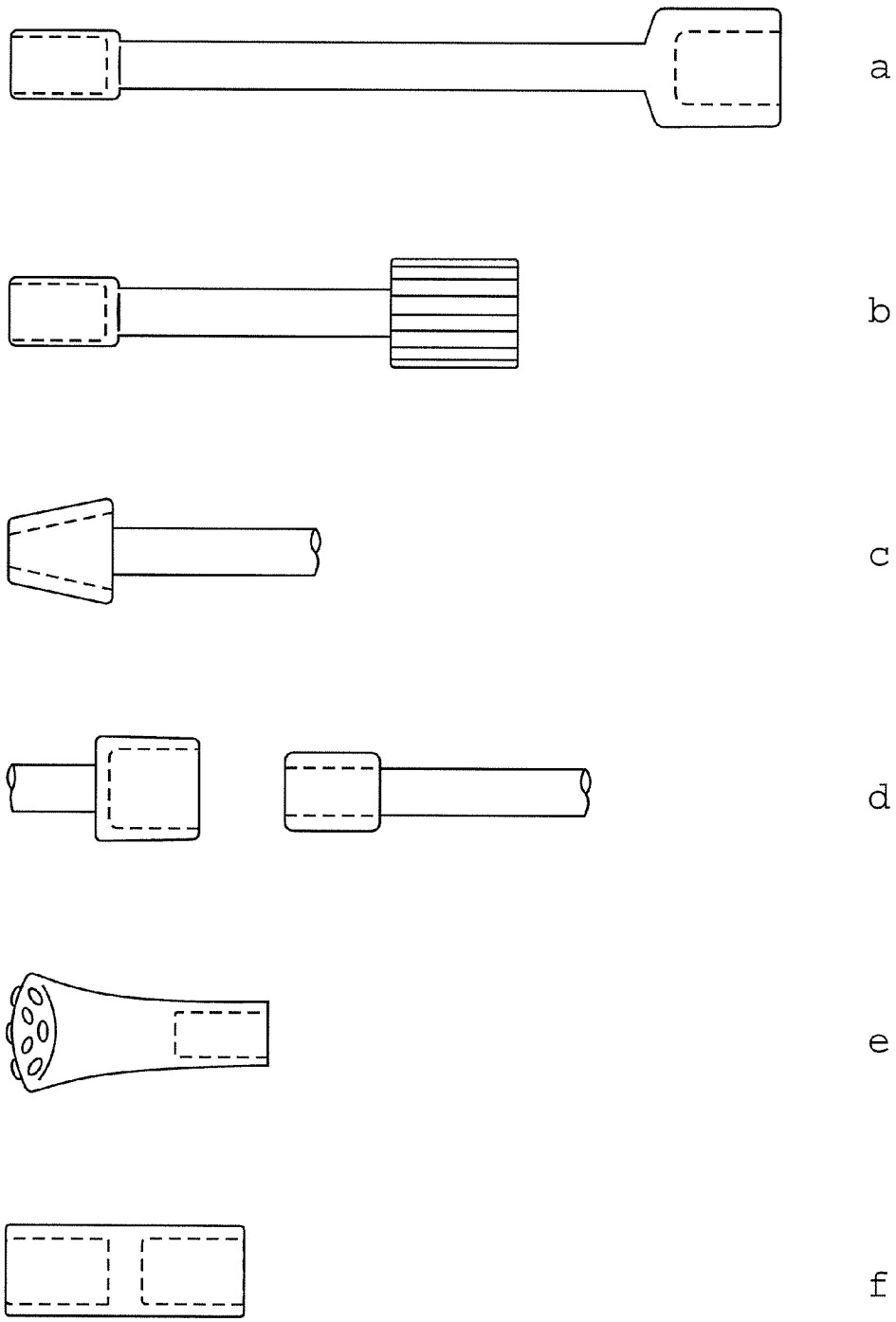
FIG. 1 diagrammatically different drill string components equipped with inventive devices, FIG. 2 a part of an axel section through a thread joint.

In FIG. 1 are shown different exemplary drill string components and parts thereof with devices according to the invention, namely:

a) A drill rod with a male thread as well as with a female thread.

b) A shank adapter with a male thread.

c) A part of a drill rod with a conical thread.

d) Parts of drill rods with a male thread and a female thread, respectively.

e) A drill bit with a female thread.

f) A joining sleeve with two female threads.

The thread joints are for threading together drill string components for percussive drilling. Inside the drill string components extends axially continuously a flushing channel for transfer of flushing flow to the drill bit.

Figure 2:
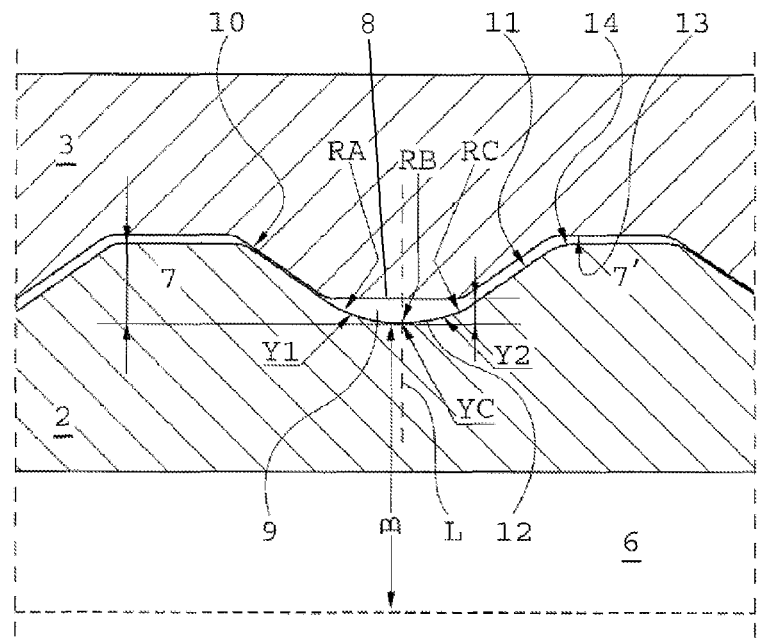

In FIG. 2 is shown a detail of an inventive thread joint, wherein a first thread ridge 7 and a second thread ridge 7' are shown belonging to the male thread. A thread ridge of the female thread is indicated with 8. Between the thread ridges 7 and 7' is positioned a thread groove 9, that receives the thread ridge 8 in turn having an essentially equal sectional shape along its extension.

The thread groove 9 has a thread bottom 12, exhibiting a plurality of surface portions having part-circular shape, which pass over into each other, namely a first surface portion Y1 having a radius RA closest to a first thread flank 10 comprising pressure flank, a second surface portion Y2 having a radius RC closest to a second thread flank 11 and an intermediate, here central, surface portion YC having a radius RB. The surface portions pass evenly, that is tangentially, over into each other. This is preferred, even if it can exist linear passages and also, which is not recommended uneven passages having angular steps between the surface portions. The treaded flanks form the same angle to a symmetry axis of the thread. Normally, this angle is 35°. In certain cases other angles can exist for example 45°.

The radius RB of the central surface portion YC is greater than both radiuses closest to the two thread flanks 10 and 11. Suitably there is a ratio between RA respectively RC and RB of about 0.05-0.70, preferably of about 0.30-0.60, and most preferred of 0.35-0.55. Hereby the advantages are obtained relating to reduced tension levels that are presented in the above introductory part of the description.

In one aspect of the invention, the thread bottom 12, in a surface area adjoining to the second thread flank 11 exhibits such a depth in respect of a height of the thread ridge 7', that in the event of an oblique position of the threaded joint, contact is established first between the thread top of the thread ridge 7' of the male thread with a thread bottom 13 of the female thread.

An imagined radial line between two adjacent thread walls is indicated with L. A smallest cross sectional radius with B. 6 indicates a flushing channel.

Figure 3:
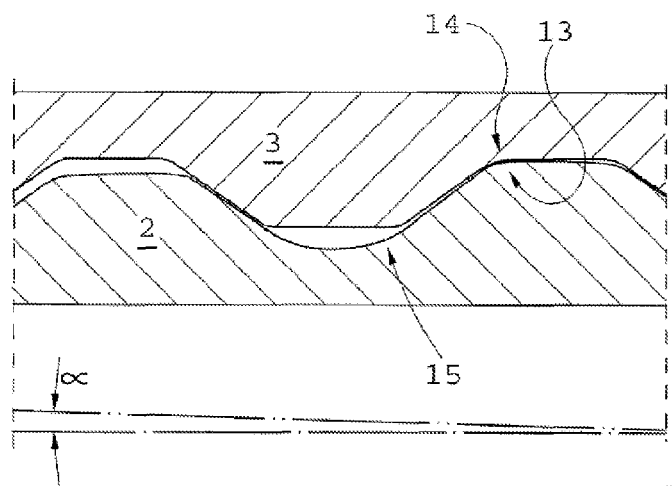
FIG. 3 shows a detail of a thread joint according to FIG. 2 in an oblique condition.

This is more evident in detail from FIG. 3, wherein an oblique positioning has occurred between the female thread 3 and the male thread 2. A central axis of the female thread is indicated with double-pointed line whereas a central axis of the male thread is indicated with a single-pointed line. The oblique position is in FIG. 3 exaggerated for clarity and is indicated with the angle α.

As is shown from FIG. 3, contact has thus been established in the area 13-14, which corresponds to contact having been reached by the thread top 14 of the male thread having come to contact with the thread bottom at 13 of the female thread. In the surface area indicated with 15 being the root area of the thread ridge of the male thread, at the second thread flank 7', there is no contact between the thread top of the female thread and the thread bottom of the male thread, which results in that burning or pitting in this area is avoided, whereby thus is avoided the otherwise resulting above discussed heating of the area 15, unhardening of the same and risk of fatigue damages to the male thread.

Figure 4A:
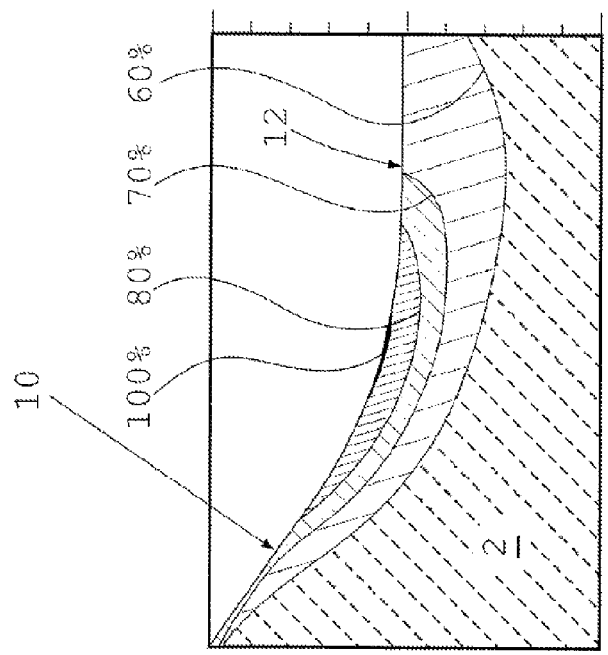
FIG. 4*a* is a computer simulation of a load situation and the figure shows a partial section through the inventive thread profile with indication of obtained tension distribution over the area of and below the thread bottom.

FIG. 4a shows obtained tension distribution of the area of and below a thread bottom of a male thread 2, which is screwed together with a not shown female thread. The figure shows a number of lines indicating the same tension, wherein the numerals (60%-85%) concerns percentage of the maximal tension which will occur in a comparative thread being a conventional trapezoidal thread according to FIG. 4b. It should be noted that load distribution is the same for the two comparative objects in the FIGS. 4a and 4b.

As is evident from FIG. 4a, the greatest tension concentration is localized to a superficial area relatively close to the pressure flank 10. The maximal registered tension is somewhat over 85° of the maximal tension occurring in respect of the comparative thread. From the figure it is also evident that the tension is distributed over a great area and that the tension extends without jumps and unevennesses.

Figure 4B:
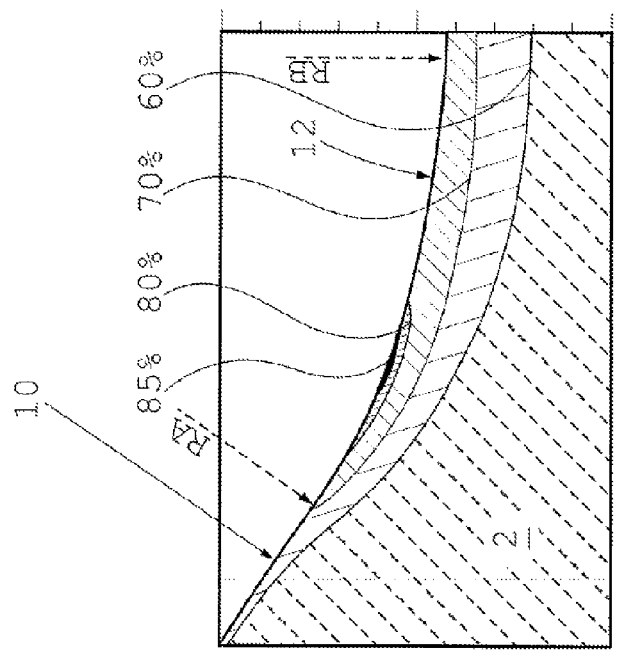
FIG. 4*b* is also a computer simulation of a load situation and the figure shows a partial section through a conventional thread profile with indication of obtained tension distribution over the area of and under the tread bottom.

As is clear from FIG. 4b, the greatest tension concentration is also here localized to a superficial area being relatively small and being relatively close to the pressure flank 10. The maximal registered tension in respect of the comparative thread is of course by definition 100%. From the figure it is evident also that the tension is distributed in a smaller area.

A comparison between the results in FIGS. 4a and 4b reveals that the maximal tension in the root area of a thread according to the invention has been reduced with up to 12-15%. Further, it is evident that the tension distribution in respect of the conventional thread, in spite of the higher tension level, is more concentrated, which results in higher effect on the material during load.

This good result for a thread according to the invention is surprising and indicates at the considerable enhancement can be expected as concerns resistance to fatigue of the device according to the invention in comparison to the conventional thread.

Figure 5:
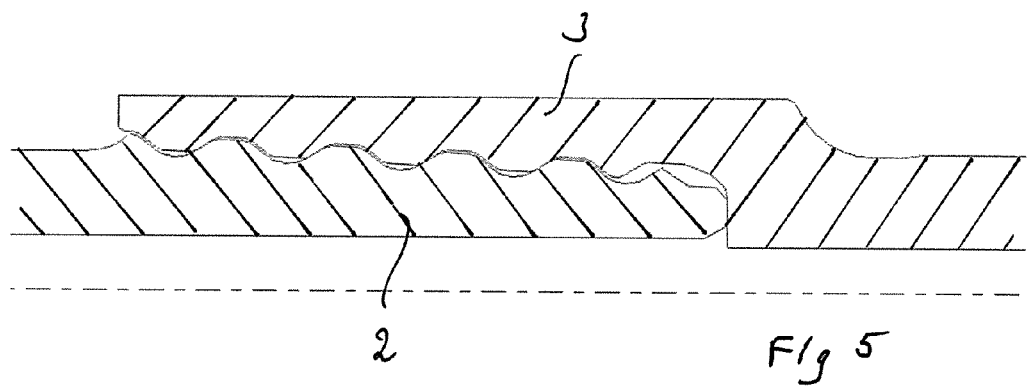
FIG. 5 shows in an axial section a conical thread joint according to the invention.

In FIG. 5 is shown a conical thread according to the invention with a male thread 2 and a female thread 3. Also in this embodiment the respective thread groove has an essentially equal sectional shape along its extension.

Figure 6A:
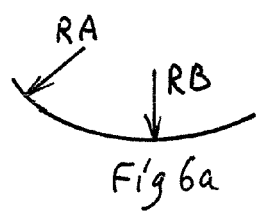
FIGS. 6*a-c* and 7*a-b* show details of a thread according to the invention.
Figure 6B:
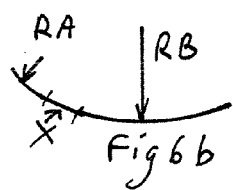
Figure 6C:
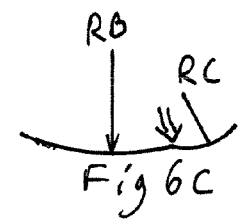

In FIG. 6a is shown a detail of a thread groove with two surface portions having part-circular shape (with the respective radius RA and RB) passing evenly and directly over into each other. In FIG. 6b is shown a detail of a thread groove having two surface portions with part-circular shape (with respective radius RA and RB) passing directly over into each other over a linear portion indicated with x. In FIG. 6c is shown a detail of a thread groove having two surface portions with part-circular shape (with the respective radius RA and RC) passing unevenly over into each other, there is no tangential passage at the unfilled arrow.

Figure 7A:
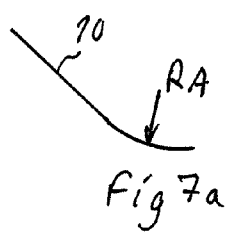
Figure 7B:
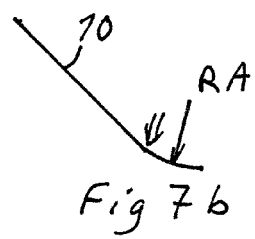

In FIG. 7a is shown a detail of a thread groove having a thread flank 10 and a surface portion with part-circular shape (with radius RA) passing evenly and directly over into each other. In FIG. 7b is shown a detail of a thread groove having a thread flank 10 and a surface portion with part-circular shape (with radius RA) passing unevenly over into each other, that is no tangential passage at the unfilled arrow.

The present invention relates to drill string components for percussive rock drilling with contact surfaces between a male thread and a female thread, wherein particular and hard requirements on the behaviour of the thread is crucial for reliable function. Generally seen is intended that the present thread provides flank angles of 20°-50° and more preferred about 22.5°-47.5°. As is indicated above a usual value of the flank angle is 35° but other angle values are preferred in certain cases, for example 45°.

Because of the demanding conditions for devices according to the invention, drill string components for percussive rock drilling, the thread in question is relatively shallow having a relationship between (thread) profile height and (thread) profile width of 0.10-0.30, more preferred 0.20-0.30 and most preferred 0.23-0.25. With profile height is here intended the distance from the bottom of the thread (the thread groove) to the thread top, and with profile width is here intended the distance between the intersections of two straight lines extending in a central axial section along two adjacent thread flanks in a thread groove with a thread top line.

A ratio between profile height (see above) and pitch of the thread in an inventive device is generally 0.05-0.25 and more preferred 0.13-0.17.

The invention is adaptable in different types of drill string components and is particularly advantageous in respect of male threads, since in respect of these, tension concentrations are of particularly great importance for the working life, simple because of the construction of the male threads and their relative sensitivity to load. Female threads in sleeve forms can be shaped with greater inherent resistance to load.

The invention claimed is:

1. A device in a drill string component for percussive rock drilling, the device comprising:

a thread for threading together with another drill string component comprising an interengaging thread, wherein the thread includes a thread groove formed by a first thread flank and a second thread flank, wherein in operation the first thread flank forms a pressure flank and an intermediate thread bottom, wherein the thread groove has an essentially equally shaped sectional form in an axial direction that extends along at least an engaging portion of the thread groove, wherein said intermediate thread bottom comprises at least three surface portions with part-circular shape, in the axial direction, and wherein said surface portions with part-circular shape have increasing radiuses, as seen from each thread flank to an intermediate surface portion of the intermediate thread bottom, said part-circular shape with increasing radiuses extending along at least the engaging portion of the thread groove.

2. The device according to claim 1, wherein at least two of said surface portions with part-circular shape pass evenly and/or directly over into each other.

3. The device according to claim 1, wherein at least one of said surface portions having part-circular shape passes evenly and/or directly over into an adjacent thread flank.

4. The device according to claim 1, wherein a ratio between a radius of a respective surface portion closest to a thread flank and a radius of said intermediate surface portion of the intermediate thread bottom is about 0.05-0.70.

5. The device according to claim 4, wherein said ratio is about 0.30-0.60.

6. The device according to claim 5, wherein said ratio is about 0.35-0.55.

7. The device according to claim 1, wherein the thread groove is asymmetrical as seen in the axial direction.

8. The device according to claim 7, wherein the intermediate thread bottom in a surface portion has a part-circular shape adjoining to the second thread flank which is opposite to the pressure flank and which extends more inwardly towards a symmetry axis of the drill string component than a surface portion with part-circular shape adjoining to the first thread flank forming the pressure flank.

9. The device according to claim 7, wherein the second thread flank opposite to the pressure flank extends longer in towards the symmetry axis of the drill string component than the first thread flank forming the pressure flank does.

10. The device according to claim 7, wherein a ratio between a radius of the surface portion having part-circular shape adjoining to the first thread flank forming pressure flank, and a radius of the surface portion having part-circular shape adjoining to the second thread flank is between 1 and 10.

11. The device according to claim 1, wherein the first thread flank and the second thread flank have linear extension as seen in an axial section of the drill string component.

12. The device according to claim 1, wherein the thread is a conical thread.

13. The device according to claim 12, wherein the conical thread has a cone angle of 2° - 8°.

14. The device according to claim 1, wherein the thread is a male thread for joining together with an interengaging female thread arranged on another drill string component.

15. The device according to claim 1, wherein the thread is a female thread for joining together with a complementary male thread arranged on another drill string component.

16. The device according to claim 1, wherein the intermediate thread bottom, at least in a surface area adjoining to the second thread flank, is formed with such a depth compared to a height of a thread top of the thread that, in the event of an oblique deviation of a joined thread joint, contact is established between an adjacent thread top of a male thread with a thread bottom of a complementary female thread, and contact in said surface area adjoining to the second thread flank with a thread top of said complementary female thread is avoided.

17. The device according to claim 1, wherein said intermediate surface portion of the intermediate thread bottom is a central surface portion of the intermediate thread bottom.

18. A thread joint including a male thread and a female thread, wherein the thread joint is formed with at least one device according to claim 1.

19. A drill string component from the group: a drill string, a shank adapter, a joining sleeve, a drill bit, a transfer adapter, including at least one device according to claim 1.

* * * * *